(12) United States Patent
Payne

(10) Patent No.: US 8,554,654 B1
(45) Date of Patent: Oct. 8, 2013

(54) APPARATUS FOR COMPUTING INDEXING PARAMETERS FOR INDEXED REVERSIONARY ANNUITY

(71) Applicant: Genesis Financial Development, Inc., Mississauga (CA)

(72) Inventor: Richard C. Payne, Mississauga (CA)

(73) Assignee: Genesis Financial Development, Inc., Mississauga, ON (CA)

( * ) Notice: Subject to any disclaimer, the term of this patent is extended or adjusted under 35 U.S.C. 154(b) by 0 days.

(21) Appl. No.: 13/720,014

(22) Filed: Dec. 19, 2012

Related U.S. Application Data

(60) Provisional application No. 61/588,945, filed on Jan. 20, 2012.

(51) Int. Cl.
*G06Q 40/00* (2012.01)
(52) U.S. Cl.
USPC ................................................. 705/35; 705/4
(58) Field of Classification Search
USPC ................................................. 705/4, 35–40
See application file for complete search history.

(56) References Cited

U.S. PATENT DOCUMENTS 5,754,980 A 5/1998 Anderson et al.
2009/0271222 A1* 10/2009 Marks et al. ................... 705/4

OTHER PUBLICATIONS http://www.reuters.com/article/2011/05/11/us-retirement-fidelity-idUSTRE74A0L720110511.
http://www.ssa.gov/oact/tr/2011/tr2011.pdf.
Fundamentals of Private Pensions, Eighth Edition, by Dan M. McGill, Kyle N. Brown, John J. Haley, Sylvester J. Schieber, Oxford University Press, © 2005, pp. 254-256.
Life Insurance, 12th Edition, Prentice Hall, Kenneth Black, Jr., Harold D. Skipper, Jr., © 1994, p. 168.

\* cited by examiner

*Primary Examiner* — Thu Thao Havan
(74) *Attorney, Agent, or Firm* — Simpson & Simpson, PLLC

(57) ABSTRACT

A computer-based apparatus for representing and acting on an indexed reversionary annuity, including a memory unit for at least one specially programmed computer configured to store computer readable instructions and an initial income amount, and a processor for the at least one specially programmed computer configured to execute the computer readable instructions to determine a set of indexing parameters P and generate an updated income amount at an end of a specified indexing term T based in part on performance of at least one index and the set of indexing parameters P.

17 Claims, 1 Drawing Sheet

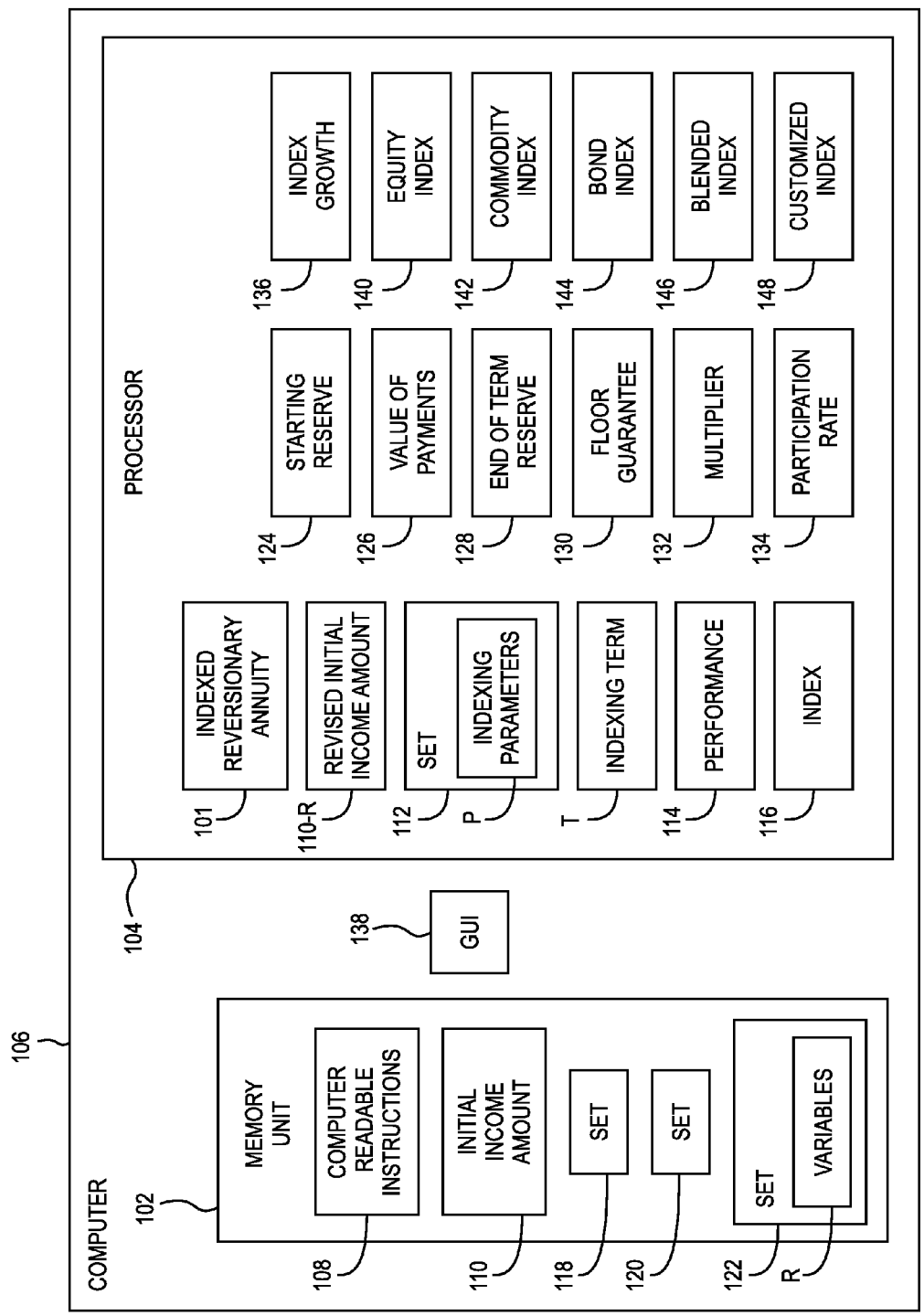

APPARATUS FOR COMPUTING INDEXING PARAMETERS FOR INDEXED REVERSIONARY ANNUITY

CROSS-REFERENCE TO RELATED APPLICATIONS

This application claims the benefit under 35 U.S.C. §119 (e) of U.S. Provisional Application No. 61/588,945, filed Jan. 20, 2012.

REFERENCE TO A COMPUTER PROGRAM

The present application includes a computer program listing in the form of an electronic file. The electronic file contains an ASCII text file of the computer program listing as follows:

| Name | Size | Created |
| --- | --- | --- |
| ireva2.txt | 13 Kb | Jan. 13, 2012 |

TECHNICAL FIELD

The present invention relates generally to financial products, more specifically to a computer-based apparatus for pricing financial products, and, even more particularly, to a program determining crediting parameters for an indexed reversionary annuity.

BACKGROUND

A key element of any financial plan is retirement planning A prolonged period of poor equity market performance and low interest rates has highlighted how many Americans are ill-prepared for retirement. As of 2011, the average 401(k) balance for an American worker is approximately $75,000. See the following website: "http://www.reuters.com/article/2011/05/11/us-retirement-fidelity-idUSTRE74A0L720110511"

Although this is an improvement over the situation during the depths of the recent financial crisis, it is far too low to provide sufficient income replacement for most people. In addition, the Social Security system is not sustainable over the long run at its current level of funding. According to the 2011 OASDI Trustees Report, the DI trust fund is projected to be exhausted by 2018, and the OASI trust fund is projected to be exhausted by 2038. See pages 10 and 11 on the following website: http://www.ssa.gov/oact/tr/2011/tr2011.pdf It is therefore clear that in most cases, a supplemental source of retirement income will be necessary if a secure retirement is to be achieved. One way to do this is to try to take maximum advantage of any pension income that is available by augmenting it with supplemental income, ideally realizing tax efficiencies and investment efficiencies as part of the design.

By way of background, pension plans can pay income for the lifetime of the employee (a single life annuity) or for the longer of the lifetime of the employee and his or her spouse (a joint and survivor annuity). The monthly income provided by a joint and survivor annuity is lower than that provided by a single life annuity—typically on the order of 80% of the single life annuity, depending on the age of the employee and spouse.

The U.S. federal pension law (ERISA) requires that the automatic option for retirement benefits for an employee that has been married for at least a year must be a joint and survivor annuity (i.e. one paying a lower amount than the single life annuity) unless the employee elects otherwise with the consent of the spouse. The spouse's consent must be in writing and must be witnessed by a notary public or a representative of the pension plan. See *Fundamentals of Private Pensions*, Eighth Edition, by Dan M. McGill, Kyle N. Brown, John J. Haley, Sylvester J. Schieber, Oxford University Press, © 2005, pages 254-256.

Clearly the desire to maximize pension income must be balanced with the natural desire to provide for the spouse's wellbeing if the employee should die first. Some degree of guarantee of the amount and timing of supplemental income is required if the employee and spouse are to make such a decision in an informed way. Also note that even if a breadwinner is not a member of a pension plan, the same type of analysis would apply if purchase of a nonqualified immediate annuity were being considered.

Traditionally, insurance products have been the best tool for individuals to manage mortality risk (through purchase of life insurance) and its obverse, longevity risk (through purchase of annuities). In this particular case, a reversionary annuity could potentially help maximize retirement income. Note that a reversionary annuity is not the same as a typical deferred or immediate annuity. It is defined as follows:

"The survivorship annuity, also referred to as reversionary annuity, provides that if the beneficiary should outlive the insured, the beneficiary will receive a predetermined income for life, regardless of his or her age at the insured's death. If the beneficiary predeceases the insured, however, the contract terminates and no further premiums or benefits are payable."

See *Life Insurance*, 12th Edition, Prentice Hall, Kenneth Black, Jr., Harold D. Skipper, Jr., ©1994, p. 168. Also see U.S. Pat. No. 5,754,980. The owner of the reversionary annuity can be the insured, the beneficiary, or a third party.

Note that in its current form, the reversionary annuity is fully guaranteed and therefore has no ability to respond to changing investment conditions (as was characteristic of products developed in an era of low and stable interest rates). There is no element of income adjustability—the fixed amount of income is stated in the contract, the amount determined by the issuer based on yield curve on the date of issue and the expected mortality of the insured and beneficiary.

It is not obvious how to adapt the reversionary annuity to current economic conditions, since its current form requires locking in extremely low interest rates (at time of writing, a 1.99% yield on a 10-year Treasury) for the life of the product. If inflation were to accelerate then the purchasing power of a fixed annual payout would diminish very quickly. Additionally, locking in the lowest interest rates in 70 years does not seem to be a wise decision. These factors make the reversionary annuity as it exists today unsuitable for pension maximization, or as a supplement to purchase of an immediate annuity.

SUMMARY

According to aspects illustrated herein, there is provided a computer-based apparatus for representing and acting on an indexed reversionary annuity, including a memory unit for at least one specially programmed computer configured to store computer readable instructions and a processor for the at least one specially programmed computer configured to execute the computer readable instructions to determine a set of indexing parameters P and generate an updated income amount at the end of a specified indexing term T based in part on the performance of at least one index and the set of indexing parameters P.

According to aspects illustrated herein, there is provided a computer-based method for representing and acting on an indexed reversionary annuity, including: using a memory unit for at least one specially programmed computer to store computer readable instructions; and using a processor for the at least one specially programmed computer to execute the computer readable instructions to: determine a set of indexing parameters P; and update the initial income amount at the end of a specified indexing term T based in part on the performance of at least one index and the set of indexing parameters P.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a schematic block diagram of a computer-based apparatus for computing indexing parameters for indexed reversionary annuity.

DETAILED DESCRIPTION OF THE INVENTION

We develop the actuarial framework required to periodically update the stated income amount of a reversionary annuity based on the performance of one or more indices ("indexing the income"), the investment strategy to support indexing, and a computer system to allow a carrier to set indexing parameters to achieve profit and expense coverage targets. This is an advance over current reversionary annuities for which the periodic income amount is fixed, stated in the contract, and cannot benefit from favorable investment performance. We also describe how to provide a choice of initial income levels, associated with stronger or weaker guarantees, to accommodate the different degrees of risk aversion of different clients.

We expect the product to display superior tax efficiency compared with typical annuities since the existing tax treatment of the traditional product is life insurance under Section 7702 of the Internal Revenue Code (IRC) (see Private Letter Ruling 9717033), and therefore most of the income payments will be excluded from the beneficiary's income as tax-free death benefits.

Developing the Actuarial Framework

In determining how to extend the traditional reversionary annuity to accommodate varying investment returns, it is helpful to consider an analogy to variable immediate annuities, even though we will end by discarding the analogy for structural and regulatory reasons.

A variable immediate annuity pays varying income over time based on the performance of an underlying mutual fund portfolio. Because the performance of the underlying mutual fund is not known in advance an adjustment mechanism, based on an assumed interest rate ("AIR") is used.

A rough explanation of the AIR calculation is given in *Variable Annuities: A Global Perspective* (ed. Tigran Kalberer and Kannoo Ravindran, Incisive Media, © 2009) pages 9 and 10:

"With a variable immediate annuity, the contract holder purchases the policy with a single premium, which is then allocated among a selection of funds underlying the contract. In addition to this, an assumed rate of return on the selected funds of e.g. 0%, 3.5%, or 5% is chosen by the policyholder. Based on this assumed interest rate, an initial monthly payment to the policyholder is determined. In each subsequent month the payment is determined as follows:

If the actual return is equal to the assumed return at the start of payment, then the payment level for the second month equals the payment made in the first month.

If the actual return is less than the assumed return, then the payment level for the second month is reduced (for the second month and all future assumed payment months) based on the difference in the associated policy "account" balance.

If the actual return is greater than the assumed return, then the payment level for the second month is increased (for the second month and all future assumed payment months) based on the difference in the associated policy "account" balance."

The above explanation provides an approximate idea (higher returns lead to higher payouts) but it is not entirely clear. Note that some tax counsel have in the past not been willing to approve AIR's lower than 3% for nonqualified annuities, because of doubts that these rates would comply with Section 72 of the Internal Revenue Code as amortizing principal sufficiently quickly. Therefore, the use of a 0% AIR in the above description should be understood in this light.

We can get a slightly more concise explanation from an educational pamphlet on variable immediate annuities from NAVA (National Association for Variable Annuities) available on page 6 of the following website: "www.irionline.org/uploads/navaorg/news/31/original/iva_pamphlet_final.pdf":

"With a variable annuity, your payments will vary based on the performance of the underlying portfolios you select. Since it cannot be determined in advance what the return will actually be, a rate of return is assumed in order to calculate the amount of your first payment and to determine how subsequent payments will change over time in response to the actual performance of your sub-accounts. This is called the assumed investment return (AIR) or benchmark rate of return. It represents the total return you need to earn annually, after expenses, to keep your income payments level. If the actual performance is higher than the AIR, your payments will go up; if it is lower, your payments will go down."

We can get a more detailed explanation by looking at the Statement of Additional Information ("SAP") for a variable immediate annuity prospectus at, for example, at the following website: "http://www.sec.gov/Archives/edgar/data/820627/000119312511120926/d485 bpos.txt":

"Annuity Unit Value

The value of an Annuity Unit for each subaccount was arbitrarily set initially at $100 for the Contracts. This was done when the first underlying Fund shares were purchased for the Contracts. The Annuity Unit Value at the end of any subsequent Valuation Period is determined by multiplying the subaccount's Annuity Unit Value for the immediately preceding Valuation Period by the quotient of (a) and (b) where:

(a) is the net investment factor (described below) for the Valuation Period for which the Annuity Unit Value is being determined; and (b) is the Assumed Investment Return for such Valuation Period.

The Assumed Investment Return adjusts for the rate of return assumed in determining the first variable income payment. Such factor for any Valuation Period shall be the accumulated value, at the end of such period, of $1.00 deposited at the beginning of such period at the Assumed Investment Return rate.

Net Investment Factor

The net investment factor is used to determine how investment results of a Fund and Contract fees and charges affect the Annuity Unit value of the subaccount from one Valuation Period to the next. The net investment factor for each subaccount for any Valuation Period is determined by dividing (a) by (b) and subtracting (c) from the result, where:
   (a) is equal to:
      (i) the net asset value per share of the underlying Fund held in the subaccount determined at the end of that Valuation Period, plus
      (ii) the per share amount of any dividend or capital gain distribution made by the underlying Fund held in the subaccount if the "ex-dividend" date occurs during that same Valuation Period, plus or minus
      (iii) a per share charge or credit, which we determine, for changes in tax reserves resulting from investment operations of the subaccount.
   (b) is equal to:
      (i) the net asset value per share of the underlying Fund held in the subaccount determined as of the end of the prior Valuation Period, plus or minus
      (ii) the per share charge or credit for any change in tax reserves for the prior Valuation Period.
   (c) is equal to the mortality and expense risk charge rate for the Valuation Period.

The net investment factor may be greater or less than the Assumed Investment Return. Therefore, the Annuity Unit value may increase or decrease from Valuation Period to Valuation Period."

The above description proves greater detail, since it describes the process in terms of Annuity Units and the value of an Annuity Unit, which is how variable immediate annuity contracts actually work in detail. However, the above description does not explain why this approach is used. An intermediate level of detail is provided at the following website: "http://www.tiaa-cref.org/ucm/groups/content/@ap_ucm_p_tcp/documents/document/tiaa01009330.pdf" in a document entitled *How-and Why-Variable Annuity Income Changes*.

"The AIR: One element of every variable annuity income calculation is investment return. When we calculate annuity units, we assume that your money will grow by 4% for each future year. At the end of each year, we compare the assumed investment return with the actual return for the year. If an account earns exactly 4%, the annuity unit value for the following year doesn't change. So if an account earns a constant rate of 4% every year (assuming no other elements in the calculation), income will never change from its initial amount due to investment performance alone.

But suppose an account's total return is 10%. Then the assets supporting future payments are much larger than what would be needed to support the existing unit value, which only needed assets to grow by 4% to maintain the unit value. So we can increase the unit value. Conversely, if the account's total return were minus 10%, the total assets are well below where they need to be to support the current unit value. We must therefore decrease the unit value. After the annuity unit value is changed, each year starts "fresh" with an assumed 4% return for that year, based on the new asset balance.

The change in the annuity unit value is based on investment performance and the assumed investment return isn't a simple addition or subtraction. It is computed as follows: Percentage Change=[(1+Investment Performance) minus ((1+AIR)] divided by (1+AIR). For example, if the investment performance were 7%, the percentage change would be 2.88%. This is slightly less than the 3% you would get by subtracting the 4% assumed investment return from the 7% investment performance."

The above approach has been used since the inception of the variable annuity in the United States. See for example "www.soa.org/library/research/transactions-of-society-of-actuaries/1968/january/tsa68v20pt1n5824.pdf" Actuarial Aspects of State Regulation of Individual Variable Annuities, by Harry Walker, 1968 Transactions of the Society of Actuaries. On page 438 we see the following statement:

"If, for the valuation period, interest corresponding to the AIR equals i' and the net investment return is at the rate i", the annuity unit value will change by the factor (1+i")/(1+i') as a result of the investment experience of that period."

Together with the premise "you hold a constant number of annuity units during the payout phase", this statement implies the NAVA description of how the payout amount changes, but still does not provide a proof that this is the correct procedure. We provide a proof here since an understanding of the concepts will allow us to extend them to an indexed reversionary annuity, based on a well-known recursion for annuity reserve values and the fact that if we ignore fixed dollar expenses (as is typical in statutory reserve calculations), the reserve for the income benefit at any point in time is linear in the income amount at that point in time. This follows from the fact that the reserve is the expected value of the future payments (see *Actuarial Mathematics*, by Newton L. Bowers, Jr., Hans U. Gerber, James C. Hickman, Donald A. Jones, and Cecil J. Nesbitt, © 1986 The Society of Actuaries, p. 131), and the linearity property of mathematical expectations (see *Probability and Statistics—Theory and Applications*, by D. A. S. Fraser, DAI Press, © 1976, p. 185).

If we take the well-known recursion for annuity values (Life Contingencies by C. W. Jordan, © 1975 Society of Actuaries, Chapter 2, Exercise 4(a)) $ä_x = 1 + vp_x ä_{x+1}$ and rearrange it to isolate $ä_{x+1}$, we get $((ä_x - 1)/p_x)(1+i) = ä_{x+1}$, using the international actuarial notation throughout. Viewing this retrospectively, we can state that the reserve at age x, minus the benefit payment of 1, divided by the number of survivors at the end of the period, and credited with interest at the rate i, gives us the reserve at age x+1 for an annuity offering a benefit of 1. But this implies that if the actual performance (say 1+i') differs from the assumed performance of (1+i), then the reserve (viewed as a retrospective accumulation) will be multiplied by a factor of (1+i')/(1+i). Because of the linearity property pointed out above, this is precisely the reserve at age x+1 for an annuity offering a benefit of (1+i')/(1+i), justifying the "multiply future income by performance relative to the AIR" rule given in the sources stated above. If we then write down the formula for a reversionary annuity in terms of single and joint life annuities, as given in Chapter 13 of Jordan: $ä_{x|y} = ä_y - ä_{xy}$, where x is the insured and y is the beneficiary, we can see that the same reasoning could be applied to each component of the formula, and so the "multiply future income by performance relative to the AIR" rule would apply to a hypothetical variable reversionary annuity. This gives us the desired actuarial approach to incorporating varying investment returns into a reversionary annuity product.

Unfortunately, however, we can't apply this variable analogy directly to create a variable reversionary annuity because of securities law requirements—the redeemability requirements of the Investment Company Act of 1940 state that securities of investment companies must be redeemable (under normal circumstances) for cash within 7 days, and this is clearly impossible for a product with no cash values.

There is a specific 40 Act exemption for life-contingent variable payout annuities (Rule 22e-1) but the exemption is not broad enough to encompass a hypothetical variable reversionary annuity, since the exemption applies only during the payout phase. Before the death of the insured the hypothetical variable reversionary annuity is not in the payout phase, and in fact may never enter the payout phase: the beneficiary may die first.

However, we can apply the same type of reasoning to an indexed (not variable) reversionary annuity. We can select product features to either ensure that income can never decrease (in which case it is reasonable to assume that no securities registration is required) or has a limited downside (in which case registration under the Securities Act of 1933 is likely required, but not under the Investment Company Act of 1940, so that no redeemability issues arise). Note that an indexed product is typically backed by bonds and call options held in an insurer's general account or a separate account, while a variable product is typically backed by mutual funds held in an insurer's separate account. The index may be an equity index, such as the S&P 500 Index, the Russell 2000 Index, the Nasdaq 100 Index, or the MSCI EAFE Index, or a commodity index, such as the S&P GSCI Total Return Index, the Dow Jones-UBS Commodity Index—Total Return, or the Auspice Broad Commodities Total Return Index, or a bond, blended, or customized index.

Since the product will not be registered under the 1940 Act there is no reason to follow the variable immediate annuity formula precisely: the multiplicative adjustment need only be of the form $(1+i')/(1+i)$ because actual fund performance (adjusted for expenses and the AIR) must be passed through in a 1940 Act product. We can look at the annuity recursion formula and the reversionary annuity formula and see the key points are: i) that future income was scaled up or down by some performance factor, and that ii) the same performance factor must be applied to both components to preserve the reversionary annuity formula. Since we are designing an indexed product not subject to the 40 Act we have some freedom in selecting the precise form for the performance formula. We can develop one more suited to an indexed product as described below under "Indexing Mechanics".

We describe two example designs and associated regulatory considerations. Design #1 has no downside to income (income can only ever increase) and would very likely not require 33 Act registration. A nonregistration opinion from securities counsel might be required depending on carrier preferences. Design #2 has a limited downside (in return for higher initial income) and may have to be registered as a security under the 33 Act. Design #2 does not wrap mutual funds, and therefore does not require 40 Act registration. There could be many more designs offering guarantees of varying strengths, but the two examples describe below suffice to make the underlying principles clear.

Indexing Mechanics: we introduce an interest rate we call the AIR analog (AIRA) at 0% for design #1 and 3% for design #2. We use it to compute the initial income amount (given the premium) or compute the premium required (given the initial income amount). Indexing is applied directly to the income amount, which is scaled up or down depending on the growth in the index and the participation rate over the term.

Premium load: since the design has nothing analogous to an account value, there is no reason to fund all the product expenses using an interest rate margin. Sales compensation and other expenses could be paid for using a premium load of 7%, for example.

The initial income is determined as $P*(1-L)/ä_{x|y}$, where P is the premium paid, the reversionary annuity value $ä_{x|y}$ is computed at the AIRA, and where L is the premium load.

Income Update Formula: At the end of each term, the income amount is multiplied by:

$$Max(FG, 1+PR*(S-E)/E)$$

where FG is the floor guarantee (say, for example, 100% for design #1 and 97% for design #2), PR is the participation rate, E is the stock index at the start of the term, and S is the stock index at the end of the term. Indexing terms could be in the range one to ten years, or even longer. Longer terms intuitively should have higher participation rates than shorter terms, all other things being equal. Note that the AIRA does not appear explicitly in the income update formula. Also note that by setting the participation rate to zero and choosing FG appropriately, the income amount will increase by a predetermined interest rate, i.e. producing the same effect as a stated credited interest rate.

Design #1 is the example case of the indexing method described above with the AIRA set to 0% and the income floor factor set at 100%. If the product is life insurance under §7702 instead of an annuity under §72, then the usual tax counsel reasoning forcing a 3% minimum AIR for regular annuities is inapplicable, and a 0% AIRA should be permissible under the Internal Revenue Code.

Design #2 is the example case of the indexing method described above with the AIRA set to a nonzero value (say 3%) and the income floor factor set to something less than 100% (say 97% for a one-year indexing term). The preceding has the advantage of providing a higher initial income amount for a given premium. If the product requires registration under the 1933 Act, as seems likely, the product can still be offered as a general account product. If carriers are more comfortable with writing registered products through an nonunitized separate account then that will govern.

Example values for design #1: Assume a male x and female y are both aged 65. Then the relevant values for determining income for design #1 are monthly annuity values assuming a 0% AIRA (effectively, life expectancies) and a variety of percentages of mortality based on the a2000 mortality table are as follows:

| Mortality % | $ä_x$ | $ä_y$ | $ä_{xy}$ | $ä_{x|y}$ | $ä_{y|x}$ |
|---|---|---|---|---|---|
| 80% | 272.67 | 302.05 | 218.13 | 83.92 | 54.54 |
| 90% | 259.99 | 290.13 | 207.44 | 82.69 | 52.55 |
| 100% | 248.91 | 279.69 | 198.12 | 81.57 | 50.79 |
| 110% | 239.11 | 270.42 | 189.88 | 80.54 | 49.23 |
| 120% | 230.35 | 262.10 | 182.52 | 79.85 | 48.10 |

Note that although the a2000 mortality table is used in the example, other mortality tables such as the 2001 CSO table could be used if this were required for regulatory reasons or provided a more accurate mortality estimate.

The way to interpret the table is that at 100% mortality, it costs $279.69 to provide a dollar per month to y for life, but that to provide it only after x's death costs $81.57. We use standard actuarial notation, with the exception that the time interval is one month rather than one year, since monthly income is more common than annual income.

The values are not very sensitive to an increase or decrease in mortality if it affects both lives in the same way, but are sensitive to the case where, for example, x's mortality is 120% of a2000 and y's mortality is 80% of a2000.

Example values for design #2: Once again, assume a male x and female y both aged 65. If we assume 3% as our AIRA, then the relevant values for determining income are:

| Mortality % | $ä_x$ | $ä_y$ | $ä_{xy}$ | $ä_{x|y}$ | $ä_{y|x}$ |
|---|---|---|---|---|---|
| 80%  | 189.17 | 204.95 | 161.23 | 43.72 | 27.94 |
| 90%  | 182.86 | 199.35 | 155.16 | 44.19 | 27.70 |
| 100% | 177.19 | 194.32 | 149.74 | 44.58 | 27.45 |
| 110% | 172.06 | 189.74 | 144.86 | 44.88 | 27.20 |
| 120% | 167.37 | 185.55 | 140.42 | 45.13 | 26.95 |

The reversionary annuity values are much lower with a 3% interest rate than at 0%—an order-of-magnitude statement is that the values are about half of those for design #1.

Option Budgeting Methods—VA Approximation and Detail

The VA approximation option budget is derived by assuming that the assets supporting the product are really supporting a variable payout annuity, applying the usual AIR mechanics, and figuring out how much can be invested in options so the floor guarantee on the income will not be breached. We end up with $OB=1-FG*(1+AIRA)^T/(1+NER)^T$, where FG and AIRA are as above, NER is the net earned rate on fixed income assets supporting the product, and T is the length of the indexing term in years. These results will not be exact (since our indexing mechanics are analogous to the operation of a variable payout annuity but not exactly the same) but the results provide a good order-of-magnitude check.

A key defect of the VA approximation method is that it does not accommodate a pricing mortality assumption different from the reserving mortality assumption. The ability to handle pricing mortality different from reserving mortality is critical for accurate option budget calculation in at least two cases that can be expected to occur frequently:

Where underwriting information indicates that either the insured or the beneficiary (or both) has expected mortality substantially different from the mortality table used for reserve calculation; or Where a statutory table is imposed for state or federal regulatory reasons but the expected mortality differs from the statutory table.

The detail method allows for pricing mortality to be different from valuation mortality and takes our actual indexing mechanics into account. The components are:

The starting reserve (computed at the AIRA) for the income at the start of the indexing term;

The expected value on the pricing basis of benefit payments to the beneficiary during the indexing term; and The expected ending reserve (computed at the AIRA) for the minimum possible income at the end of the indexing term. The expectation here is over mortality, not over investment performance, because we need to use pricing mortality to combine reserves for three cases: Both x and y still alive, x only alive (in which case the reserve is zero), and y only alive (in which case we have a single premium immediate annuity (SPIA) reserve, effectively).

The option budget is then the starting reserve (computed at the AIRA), minus the discounted expected value of payments to the beneficiary during the term, minus the discounted expected end of term reserve (computed at the AIRA) for the lowest possible end-of-term income that can be produced by the indexing formula. The discounting is done at the net earned rate (risk free rate plus bond spread minus product spread).

Sample option budgets for different indexing terms for both design #1 (AIRA=0%) and design #2 (AIRA=3%), computed two different ways as described above, are as follows:

| Term (Years) | VA, AIRA = 0% | Detail, AIRA = 0% | VA, AIRA = 3% | Detail, AIRA = 3% |
|---|---|---|---|---|
| 1 | 1.96% | 2.27%  | 2.05%  | 2.47%  |
| 2 | 3.88% | 4.49%  | 4.15%  | 4.96%  |
| 3 | 5.77% | 6.77%  | 6.23%  | 7.46%  |
| 4 | 7.61% | 8.80%  | 8.50%  | 9.94%  |
| 5 | 9.43% | 10.88% | 10.75% | 12.40% |

The option budgets increase roughly linearly with the term as would be expected from general reasoning.

Once the option budget has been computed then the purchase of an option to provide the indexing benefit can be considered based on then-current option prices. We focus on call options to provide positive indexing performance when indices rise, although a "bear" product based on put options can also be constructed as is obvious to one skilled in the art.

Call options are well known and are described in standard works such as *Options, Futures, and Other Derivative Securities* by John Hull, Prentice-Hall International, © 1989. In order to determine how much index participation can be provided we divide the option budget by the then-current price of an option: this gives us the participation rate, if the indexing method provides for the same payoff formula as a European call option.

Although the attached computer code illustrates the use of the Black-Scholes formula to price a European call option, it is obvious to one skilled in the art that many other option types can be adapted as indexing methods by comparing the price of an option with the available option budget and scaling appropriately. See for example *The Complete Guide to Option Pricing Formulas* by Espen Gaarder Haug, McGraw-Hill, © 1998. The formulas are equally applicable to equity and commodity options for appropriate choices of the parameters.

Additionally, indexing methods are not limited to options with closed-form formulas: see for example *Derivatives*, by Paul Wilmott, John Wiley & Sons, © 1998 for a selection of numerical methods used to price options not having closed-form formulas. Similarly, the use of a participation rate is only one of many choices in the indexing formula—for example a cap or spread could be used. See U.S. Pat. Nos. 6,049,772, 7,386,500, 7,590,581, and 7,987,132, for example.

Sample Participation Rates

For purposes of calculating sample participation rates, a product spread (deduction from net earned interest rate to fund carrier profits and expenses other than field compensation, including premium and DAC tax) of 150 basis points (1.5%) was assumed. This assumption is not critical given that a premium load can also be levied. Assuming a 10-year Treasury yield of 2%, corporate spreads over Treasuries of 150 bp, 20% index volatility, and pricing mortality equal to 80% of reserving mortality, we obtain the following sample results for a 65-year old male with a 62-year old spouse:

| Term (Years) | Floor Guarantee, AIRA = 0% | Participation Rate, AIRA = 0% | Floor Guarantee, AIRA = 3% | Participation Rate, AIRA = 3% |
| --- | --- | --- | --- | --- |
| 1 | 1.00 | 28.94% | 0.97 | 26.68% |
| 2 | 1.00 | 41.48% | 0.94 | 36.64% |
| 3 | 1.00 | 51.56% | 0.91 | 44.40% |
| 4 | 1.00 | 60.51% | 0.88 | 51.21% |
| 5 | 1.00 | 68.84% | 0.85 | 57.54% |

The participation rate and floor guarantee are used in the Income Update Formula described above to update the income amount at the end of each term. As can be seen by examining the formula, with a floor guarantee of 1, income can never decrease. With a starting index value of 1000, an ending index value of 1500, and a participation rate of 68.84%, income will be increased by 34.42% at the end of the term, with no possibility of decrease no matter how low the ending index value is. Similar results hold with a floor guarantee of less than 1, although in this case the decrease in the income is limited to a specific number (e.g. 3%) rather than being prevented altogether.

APL Source Code and Method of Operation

APL (and its more modern dialect APL2) are high-level array-oriented programming languages often used by actuaries. APL2 is described in (for example) *APL2 In Depth*, by Norman D. Thomson and Raymond P. Polivka, Springer-Verlag, © 1995.

Method of Operation: load the IREVA2 workspace using the APL2000 APL*PLUS APL interpreter, and if necessary update the key pricing assumptions, which are given in the global character matrix Assns as follows:
equityVol 0.2
equityDiv 0.019
riskFreeRate 0.02
earnedSpreadOverRiskFree 0.015
indexingTerm 5
startingMonthlyIncome 2000
productSpread 0.015
assumedInterestRate 0.03
incomeFloorFactor 0.85
age1 65
sex1 1
age2 62
sex2 0
priceMort 0.8×a2000
vint 0.04
valnMort a2000

Edit the assumptions stored in the Assns matrix if necessary, by using keyboard or mouse to position the cursor at the numerical value currently set for the assumption, highlighting the existing value, and typing the replacement value. For example, to change the pricing mortality assumption from 80% of a2000 to 70%, highlight "0.8" and type "0.7". Then exit the editor, saving the Assns matrix, by typing the editor exit command (Control-e), type "go" at the command line, and hit enter—the participation rate will be output to the screen.

Brief Description of Key Functions black: This function implements the Black-Scholes formula for a call price and other option parameters.

get3: This function gets expected survival probabilities for all three statuses (both x and y alive, x only alive, y only alive) padded out to a common length.

getAssns: This function parses the Assns matrix and returns two vectors (varname, expression), allowing for comments and line wrap in the Assns matrix.

gettpx: This function gets a $_tP_x$ vector (a vector of expected survival probabilities) from a mortality table.

go: This is the top-level function to be invoked by the user.

irevLevel0: This is the key pricing function, with method of operation as follows:

Get the initial reserve for starting income using $ä_{x|y}$ computed at the AIR analog rate, knowing that everyone's alive at issue.

Get expected probability of survival each status per-unit-issued on pricing basis, where status x is the insured, status y is the beneficiary, and status xy represents their joint survival.

Get present values of the benefit stream (income payments to y) during the indexing term.

Get the final reserve for income under $ä_{x|y}$ at the AIR analog rate, noting that which reserve to use depends on how many of each status are in force at the end of the term.

Calculate the option budget and participation rate using methods described above (both the VA analog approximation and the detail method).

minc2: This function calculates an annuity factor for monthly income given age sex and certain period.

unormf: This function calculates the cumulative normal distribution using an approximation taken from *Handbook of Mathematical Functions*, Milton Abramowitz and Irene Stegun, Dover Publications, © 1964.

FIG. 1 is a schematic block diagram of computer-based apparatus 100 for representing and acting on indexed reversionary annuity 101. Apparatus 100 includes memory unit 102 and processor 104 for at least one specially programmed computer 106. Unit 102 is configured to store computer readable instructions 108 and initial income amount 110. The processor is configured to execute the computer readable instructions to determine set 112 of indexing parameters P and update the initial income amount at an end of a specified indexing term T based in part on performance 114 of at least one index 116 and set 112 of indexing parameters P.

In an example embodiment, the memory unit is configured to store set 118 of economic variables representing fixed income and equity market conditions at time of issue of the indexed reversionary annuity, set 120 of variables representing expected mortality for the insured and beneficiary of the indexed reversionary annuity, and set 122 of variables R representing required expenses and profits for an issuer of the indexed reversionary annuity. In an example embodiment, determining set 112 of indexing parameters P includes using the initial income amount and sets 118, 120, and 122.

In an example embodiment, determining set 112 of indexing parameters P includes using sets 118, 120, and 122 to compute starting reserve 124, discounted expected value of payments 126 to the beneficiary during the indexing term, and expected end of term reserve 128 for the lowest possible updated income amount at the end of indexing term T. In an example embodiment, updating the initial income amount includes updating the initial income amount at the end of each indexing term T by multiplying the initial income amount by the larger of floor guarantee 130 or multiplier 132 of (1+ (participation rate 134×index growth 136)). The index growth is computed as (S−E)/E. E is a stock index at the start of the term, and S is the stock index at the end of the term.

In an example embodiment, computer 106 includes graphical user interface (GUI) 138 and the processor is configured to display initial income amount 110 on the GUI; receive revised initial income amount 110-R from the user, and update the revised initial income amount at the end of specified indexing term T based in part on the performance of index 116 and set 112. In an example embodiment, the processor is configured to receive floor guarantee 130 equal to 1 from the user, and update initial income amount 110 at the end of specified indexing term T based in part on the performance of index 116 and set 112 such that the updated initial income amount is at least equal to the initial income amount multiplied by the floor guarantee.

In an example embodiment, the processor is configured to receive floor guarantee 130 equal to less than 1 from the user, and update initial income amount 110 at the end of specified indexing term T based in part on the performance of index 116 and the set 112 such that the updated initial income amount is at least equal to the initial income amount multiplied by the floor guarantee. In an example embodiment, the processor is configured to receive floor guarantee 130 greater than 1 from the user, and update initial income amount 110 at the end of specified indexing term T based in part on the performance of index 116 and the set of indexing parameters P such that the updated initial income amount is at least equal to the initial income amount multiplied by the floor guarantee.

In an example embodiment, the at least one index 116 includes: equity index 140 including the S&P 500 Index, the Russell 2000 Index, the Nasdaq 100 Index, or the MSCI EAFE Index; commodity index 142 including the S&P GSCI Total Return Index, the Dow Jones-UBS Commodity Index—Total Return, or the Auspice Broad Commodities Total Return Index; or bond index 144, blended index 146, or customized index 148. In an example embodiment, indexed reversionary annuity 101 is registered as a security under the Securities Act of 1933, or indexed reversionary annuity 101 is not registered as a security under the Securities Act of 1933.

In an example embodiment, reversionary annuity 101 is defined as an annuity such that: if the beneficiary outlives the insured, the beneficiary receives a predetermined income for life, regardless of the age of the beneficiary at the time of the death of the insured; and if the beneficiary predeceases the insured, the contract for the annuity terminates and no further premiums or benefits are payable.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A computer-based apparatus for representing and acting on an indexed reversionary annuity, comprising:
a memory unit for at least one specially programmed computer configured to store:
computer readable instructions; and,
an initial income amount;
a processor for the at least one specially programmed computer configured to execute the computer readable instructions to:
determine a set of indexing parameters P; and,
update the initial income amount at an end of a specified indexing term T based in part on a performance of at least one index and the set of indexing parameters P,
wherein the processor is configured to:
receive a floor guarantee equal to 1 from the user; and,
update the initial income amount at the end of the specified indexing term T based in part on the performance of said at least one index and the set of indexing parameters P such that said updated initial income amount is at least equal to the initial income amount multiplied by the floor guarantee; or,
wherein the processor is configured to:
receive a floor guarantee equal to less than 1 from the user; and,
update the initial income amount at the end of the specified indexing term T based in part on the performance of said at least one index and the set of indexing parameters P such that said updated initial income amount is at least equal to the initial income amount multiplied by the floor guarantee; or,
wherein the processor is configured to:
receive a floor guarantee greater than 1 from the user; and,
update the initial income amount at the end of the specified indexing term T based in part on the performance of said at least one index and the set of indexing parameters P such that said updated initial income amount is at least equal to the initial income amount multiplied by the floor guarantee.

2. The computer-based apparatus of claim 1 wherein:
the memory unit is configured to store:
a set of economic variables representing fixed income and equity market conditions at time of issue of said indexed reversionary annuity;
a set of variables representing expected mortality for an insured and a beneficiary of said indexed reversionary annuity; and
a set of variables R representing required expenses and profits for an issuer of said indexed reversionary annuity; and,
determining said set of indexing parameters P includes using:
said initial income amount;
said set of economic variables representing the fixed income and equity market conditions at the time of issue of said indexed reversionary annuity;
said set of variables representing the expected mortality for the insured and the beneficiary of said indexed reversionary annuity; and
said set of variables R representing the required expenses and profits for the issuer of said indexed reversionary annuity.

3. The computer-based apparatus of claim 2 wherein determining said set of indexing parameters P includes using the set of economic variables representing fixed income and equity market conditions, the set of variables representing expected mortality, and the set of variables R to compute:
a starting reserve;
a discounted expected value of payments to the beneficiary during the indexing term; and,
an expected end of term reserve for the lowest possible updated income amount at the end of the indexing term.

4. The computer-based apparatus of claim 1 wherein:
updating the initial income amount includes updating the initial income amount at the end of each indexing term T by multiplying the initial income amount by the larger of:
a floor guarantee; or,
a multiplier of (1+(a participation rate×an index growth));

the index growth is computed as (S−E)/E; and,

E is a stock index at the start of said each term T, and S is the stock index at the end of said each term T.

5. The computer-based apparatus of claim 1 wherein the processor is configured to:
   display the initial income amount;
   receive a revised initial income amount from the user; and,
   update the revised initial income amount at the end of the specified indexing term T based in part on the performance of said at least one index and the set of indexing parameters P.

6. The computer-based apparatus of claim 1 wherein the at least one index includes:
   an equity index including the S&P 500 Index, the Russell 2000 Index, the Nasdaq 100 Index, or the MSCI EAFE Index; or
   a commodity index including the S&P GSCI Total Return Index, the Dow Jones-UBS Commodity Index—Total Return, or the Auspice Broad Commodities Total Return Index; or,
   a bond index, a blended index, or a customized index.

7. The computer-based apparatus of claim 1 wherein:
   said indexed reversionary annuity is registered as a security under the Securities Act of 1933; or,
   said indexed reversionary annuity is not registered as a security under the Securities Act of 1933.

8. The computer-based apparatus of claim 1 wherein a reversionary annuity is defined as an annuity such that:
   if a beneficiary outlives an insured, the beneficiary receives a predetermined income for life, regardless of the age of the beneficiary at a time of the death of the insured; and,
   if the beneficiary predeceases the insured, a contract for the annuity terminates and no further premiums or benefits are payable.

9. A computer-based method for representing and acting on an indexed reversionary annuity, comprising:
   storing, in a memory unit for at least one specially programmed computer: computer readable instructions and an initial income amount; and,
   executing, using a processor for the at least one specially programmed computer, the computer readable instructions to:
      determine a set of indexing parameters P;
      update the initial income amount at an end of a specified indexing term T based in part on performance of at least one index and the set of indexing parameters P; and,
      receive a floor guarantee equal to 1 from the user, and update the initial income amount at the end of the specified indexing term T based in part on the performance of said at least one index and the set of indexing parameters P such that said updated initial income amount is at least equal to the initial income amount multiplied by the floor guarantee; or
      receive a floor guarantee equal to less than 1 from the user, and update the initial income amount at the end of the specified indexing term T based in part on the performance of said at least one index and the set of indexing parameters P such that said updated initial income amount is at least equal to the initial income amount multiplied by the floor guarantee; or,
      receive a floor guarantee greater than 1 from the user, and update the initial income amount at the end of the specified indexing term T based in part on the performance of said at least one index and the set of indexing parameters P such that said updated initial income amount is at least equal to the initial income amount multiplied by the floor guarantee.

10. The computer-based method of claim 9 further comprising storing in the memory unit:
    a set of economic variables representing fixed income and equity market conditions at time of issue of said indexed reversionary annuity;
    a set of variables representing expected mortality for an insured and a beneficiary of said indexed reversionary annuity; and
    a set of variables R representing required expenses and profits for an issuer of said indexed reversionary annuity, wherein:
       determining said set of indexing parameters P includes using:
          said initial income amount;
          said set of economic variables representing the fixed income and equity market conditions at the time of issue of said indexed reversionary annuity;
          said set of variables representing the expected mortality for the insured and the beneficiary of said indexed reversionary annuity; and,
          said set of variables R represents required the expenses and profits for the issuer of said indexed reversionary annuity.

11. The computer-based method of claim 10, wherein determining said set of indexing parameters P includes computing a starting reserve, a discounted expected value of payments to the beneficiary during the indexing term, and an expected end of term reserve for the lowest possible updated income amount at the end of the indexing term, using:
    said set of economic variables representing the fixed income and equity market conditions at the time of issue of said indexed reversionary annuity;
    said set of variables representing the expected mortality for the insured and the beneficiary of said indexed reversionary annuity; and,
    said set of variables R represents required the expenses and profits for the issuer of said indexed reversionary annuity.

12. The computer-based method of claim 9, wherein:
    updating the initial income amount includes updating the initial income amount at the end of each indexing term T by multiplying the initial income amount by the larger of:
       a floor guarantee; or,
       a multiplier of (1+(a participation rate×an index growth));
    the index growth is computed as (S−E)/E; and,
    E is the stock index at the start of said each term T, and S is the stock index at the end of said each term T.

13. The computer-based method of claim 9, further comprising:
    displaying, using the processor, the initial income amount;
    receiving, using the processor, a revised initial income amount from the user; and,
    updating, using the processor, the revised initial income amount at the end of the specified indexing term T based in part on the performance of said at least one index and the set of indexing parameters P.

14. The computer-based method of claim 9 wherein the at least one index includes:
    an equity index including the S&P 500 Index, the Russell 2000 Index, the Nasdaq 100 Index, or the MSCI EAFE Index; or a commodity index including the S&P GSCI Total Return Index, the Dow Jones-UBS Commodity Index—Total Return, or the Auspice Broad Commodities Total Return Index; or, a bond index, a blended index, or a customized index.

15. The computer-based method of claim 9 wherein:

said indexed reversionary annuity is registered as a security under the Securities Act of 1933; or, said indexed reversionary annuity is not registered as a security under the Securities Act of 1933.

16. The computer-based method of claim 9 wherein a reversionary annuity is defined as an annuity such that:

if a beneficiary outlives an insured, the beneficiary receives a predetermined income for life, regardless of the age of the beneficiary at a time of the death of the insured; and, if the beneficiary predeceases the insured, a contract for the annuity terminates and no further premiums or benefits are payable.

17. A computer-based apparatus for representing and acting on an indexed reversionary annuity, comprising:

a memory unit for at least one specially programmed computer configured to store:
computer readable instructions; and,
an initial income amount;

a processor for the at least one specially programmed computer configured to execute the computer readable instructions to:
determine a set of indexing parameters P; and, update the initial income amount at an end of a specified indexing term T based in part on a performance of at least one index and the set of indexing parameters P, wherein the at least one index includes:

an equity index including the S&P 500 Index, the Russell 2000 Index, the Nasdaq 100 Index, or the MSCI EAFE Index; or a commodity index including the S&P GSCI Total Return Index, the Dow Jones-UBS Commodity Index—Total Return, or the Auspice Broad Commodities Total Return Index; or, a bond index, a blended index, or a customized index.

* * * * *